Figure 1:
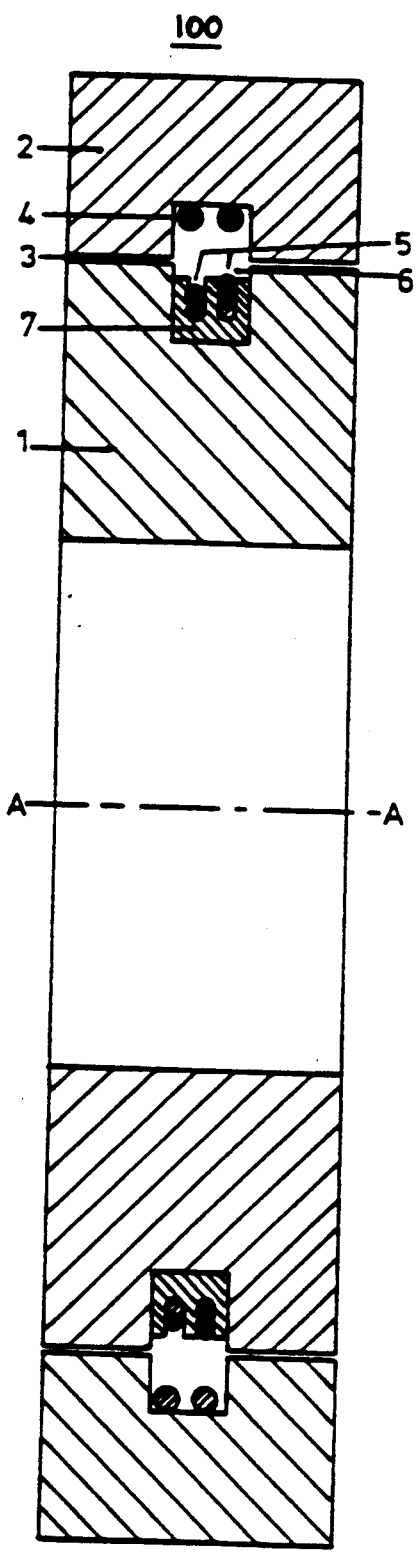

United States Patent [19]
Schalk

[11] Patent Number: 5,001,585
[45] Date of Patent: Mar. 19, 1991

[54] ROTATIONAL TRANSFORMER FOR A TAPE RECORDER

[75] Inventor: Adelbert Schalk, Wutöschingen, Fed. Rep. of Germany

[73] Assignee: Deutsche-Thomson Brandt GmbH, Villingen-Schwenningen, Fed. Rep. of Germany

[21] Appl. No.: 408,037

[22] Filed: Sep. 15, 1989

[30] Foreign Application Priority Data

Sep. 17, 1988 [DE] Fed. Rep. of Germany ....... 3831721

[51] Int. Cl.$^5$ .............................................. G11B 5/52
[52] U.S. Cl. ..................................... 360/108; 336/123
[58] Field of Search ............ 360/107, 108, 84, 130.22, 360/130.23, 130.24; 336/120, 123

[56] References Cited

U.S. PATENT DOCUMENTS

| | | | |
|---|---|---|---|
| 3,317,874 | 5/1967 | Honsinger | 336/120 |
| 3,458,844 | 7/1969 | Hildebrandt | 336/192 |
| 3,611,230 | 10/1971 | Maake | 336/123 X |

FOREIGN PATENT DOCUMENTS

| | | | |
|---|---|---|---|
| 3035676 | 4/1982 | Fed. Rep. of Germany. | |
| 3509584 | 9/1986 | Fed. Rep. of Germany. | |
| 0731462 | 4/1980 | U.S.S.R. | 360/108 |

Primary Examiner—Robert S. Tupper
Assistant Examiner—Andrew L. Sniezek
Attorney, Agent, or Firm—Joseph S. Tripoli; Joseph J. Laks

[57] ABSTRACT

A rotational transformer for a rotational transducer in a tape recorder includes a stator piece having a first ring-shaped magnetic core and a stator winding associated therewith. A rotor piece includes a second ring-shaped magnetic core coaxially located with the first ring-shaped magnetic core, a rotor winding and a coil carrier formed of a nonmagnetic material. The carrier is inserted into a ring-shaped recess formed in the second core. The coil carrier is constructed with at least one slot into which wire of the rotor winding is emplaced. The slot is of a width adopted to the size of the wire of the rotor winding.

6 Claims, 2 Drawing Sheets

ROTATIONAL TRANSFORMER FOR A TAPE RECORDER

The invention relates to a rotational transformer for a tape recorder.

Due to the reduction in sizes of head drums or rotational transducers for video recorders and the increase in nunber of channels as well as the changeover to higher frequencies, the dimensions of such rotational transducers are becoming smaller. In these cases the necessity may arise, when designing a rotational transformer for such a transducer, to fit only a few winding turns of a thin wire of a diameter of approximately 0.1 mm into a ferrite core of a very small thickness of between 1 and 2 mm. In addition, in the case of a recorder with a matrix-type recording system (MaSc) according to DE-OS 35 09 584, the rotational transducers allocated to the single heads should have identical transmission characteristics, so that the system can work without additional adaptation to each of the head amplifiers. For this purpose it is desirable to arrange the wires in the winding space in a defined way and with as little winding capacity as possible.

In accordance with an aspect of the invention the transformer core for a rotational transducer is constructed in a way that facilitates manufacturing and allows for a well-defined position of wires within the core.

As a feature of the invention, a small plastic coil form is inserted into a ferrite core or a core formed from a material with similar qualities. This plastic coil form carries circumferential grooves or slots for taking up the wire of the winding. Such grooves in a plastic body may be manufactured with high accuracy. The width is advantageously designed to let the wire fit straight into the grooves with little indentation of the lacquer coating. By means of the coil form an electrically and magnetically neutral area is created within the ferrite core, which guarantees a highly accurate and well-defined position of the windings formed by the continuous wire.

Figure 2:
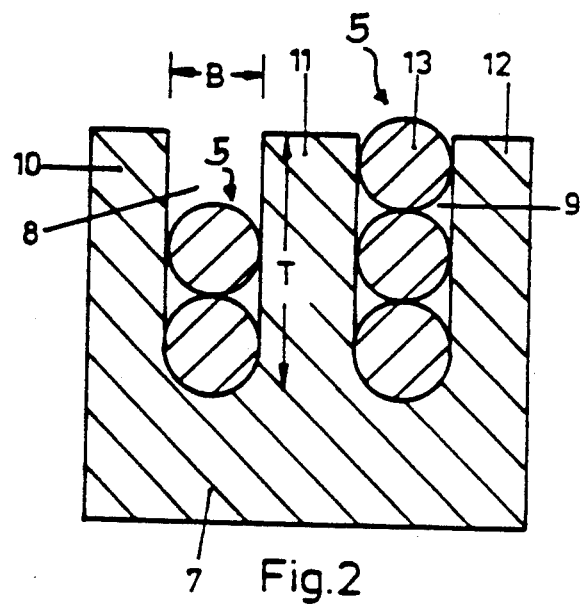
Figure 3:
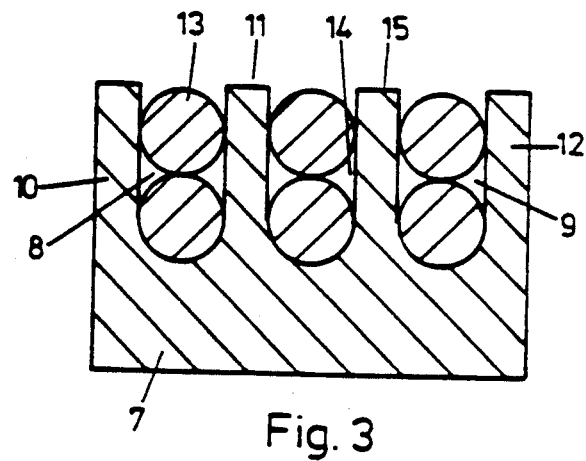
Figure 4:
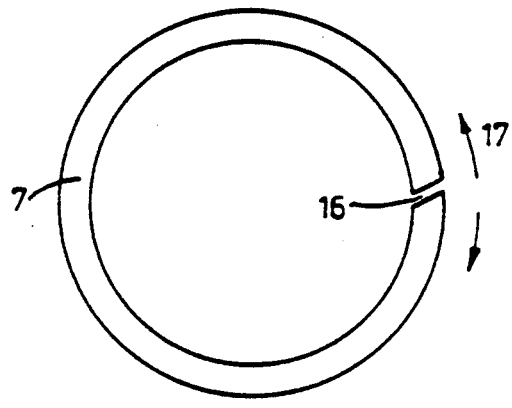
Figure 5:
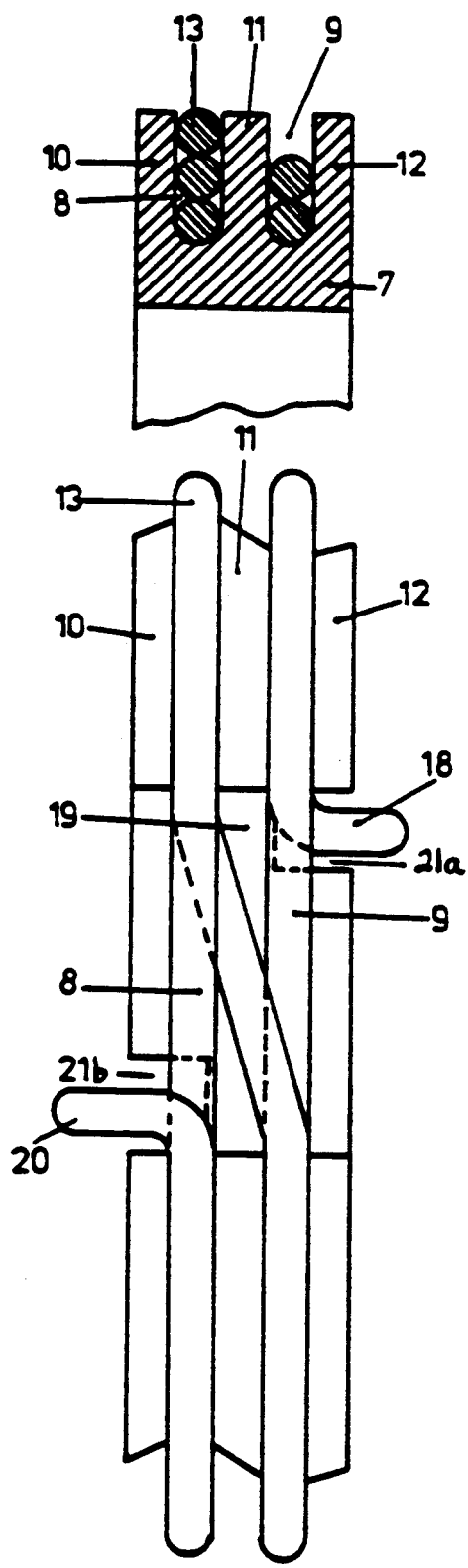

FIG. 1 illustrates in cross section a transformer for a rotational transducer designed according to the invention;

FIG. 2 an enlarged section from FIG. 1;

FIG. 3 a modification of the configuration according to FIG. 2;

FIG. 4 the shape of the coil form;

FIG. 5 the position of wires within the grooves of the coil form; and

Figure 6:
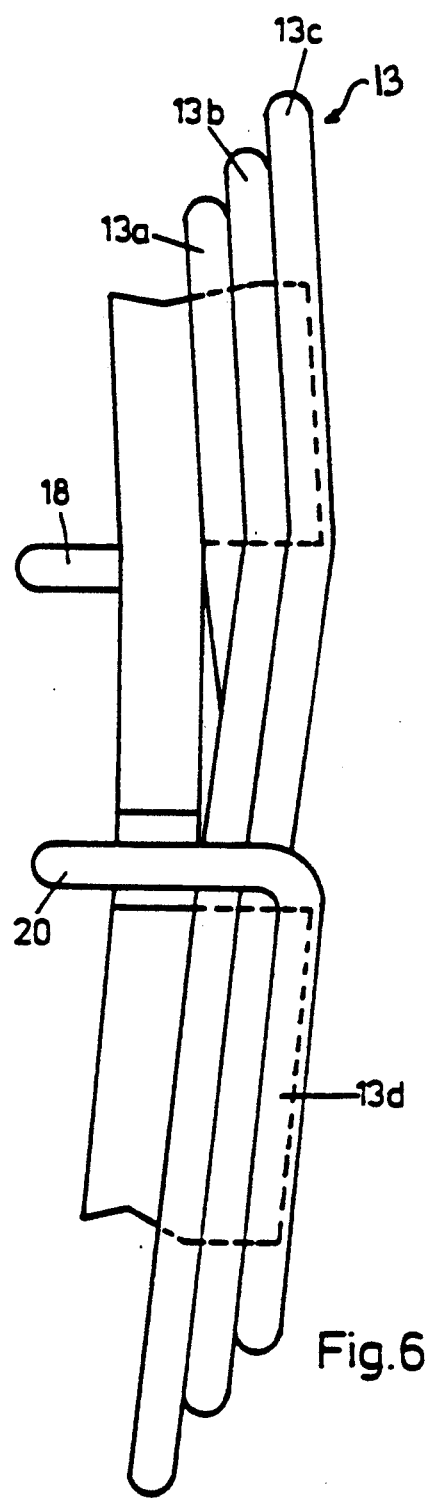

FIG. 6 a side elevational view of the configuration according to FIG. 5.

FIG. 1 illustrates a rotational transformer 100 of a video tape recorder. Transformer 100 is part of an otherwise conventionally designed headwheel or rotational transducer arrangement, sucha as described in DE-OS 30 35 676.

Transformer 100 comprises two ring-shaped ferrite cores 1 and 2 fitted together coaxially, leaving an air slot 3 at a width of approximately 35 μm. Ferrite core 2 is part of a stator piece. Core 2 encompasses, in a cicumferential groove, a stator winding 4, which is connected to stationary electrical circuitry, not shown, such as head preamplifier circuitry.

Ferrite core 1 rotates about an axis A and therefore acts as part of the piece of the rotational transformer. Core 1 is equipped with an outer circumferential groove 6. A coil form 7, which is made of a nonmagnetic, nonconductive synthetic material, is fitted tightly into groove 6, and may also be glued therein. Coil form 7 is equipped with two outer circumferential grooves or slots, in which the wires of a rotor winding 5 of the transformer are inserted. Winding 5 is connected to the rotating head, not shown, of the recorder headwheel.

FIG. 2 shows the construction details of coil form 7 fitted into outer circumferencial groove 6 of FIG. 1. Circumferential slots 8 and 9 of coil form 7 are formed by three walls 10, 11, 12. Slots 8 and 9 serve to take up the continuous wire 13 of winding 5, which wire is wound about rotating core 1. Each of slots 8 and 9 has a width B of 0.1 mm and a depth T of 0.3 mm. Width B and the diameter or size of wire 13 are adapted to each other in such a way that the wire fits tightly into slots 8 and 9, with minimum strain on its lacquer coating. As an alternative, a flat wire with a rectangular section may be used, thereby providing a good utilization factor of the winding space.

The number of winding turns for windings 5 and 4 is determined by the desired electrical transformation ratio, rotor-to-stator, of e.g. 5:2 for rotational transformer 100. If, for example, five winding turns are set into slots 8 and 9, then one of the slots, e.g. slot 8 is not completely filled.

FIG. 3 illustrates a modification of FIG. 2 in which three slots 8, 14 and 9 have been formed by using 4 walls 10, 11, 15 and 12. The three slots take up a total of six turns of wire 13.

Advantageously, as illustrated in FIG. 4, coil form 7 is equipped with a slit 16 in one location. By means of this slit, form 7 can be widened in the direction of arrows 17 and inserted like a snap ring into groove 6 of ferrite core 1. As a further advantage, coil carrier 7 may be wound with winding 5 before the carrier is inserted into core 1. As an additional option, winding 5 may be encapsulated into the carrier.

FIGS 5 and 6 illustrate in elevational view the emplacement of wire 13 in the two grooves 8 and 9. In FIG. 5, the start portion 18 of wire 13 is inserted through an opening 21a in wall 12 and placed at the bottom of slot 9. Subsequently, two further layers of wire 13 are wound in slot 9. Then, wire 13 is transferred through a slot or passageway 19 in wall 11 into slot 8 and there wound in three layers. Following this, end portion 20 is brought outside through an opening 21b in wall 10. Coil form 7 constructed as shown in FIG. 5 has the advantage that only one transferral from slot 8 to slot 9 is present, and the winding technique is therefore simplified.

FIG. 6 illustrates in side elevational view the individual layers of continuously wound wire 13 in slots 8 and 9, one layer above the other according to FIG. 5. Shown of wire 13 are a bottom layer 13a, which forms the beginning of the third turn of winding 5, a middle layer 13b, which forms the beginning of the fourth winding turn, a top layer 13c, which forms the beginning of the fifth winding turn and a layer 13d, which forms end portion 20 of the fifth winding turn. End 20 is led outside through opening 21b.

I claim:

1. A rotational transformer for a rotational transducer in a tape recorder comprising: a stator piece including a first ring-shaped magnetic core and a ring-shaped stator winding coaxially located thereon, and a rotor piece located in proximity to said stator piece and capable of being rotating about an axis common with said stator piece and including a second ring-shaped amgnetic core coaxially located with said first ring-shaped mangnetic core, a ring-shaped rotor winding and a preformed coil carrier insert made into a ring of a nonmagnetic material and being inserted into a ring-shaped recess formed in said second core, said coil carrier being constructed with at least a first slot into which wire of said rotor winding is emplaced.

2. A transformer according to claim 1 wherein said coil carrier is constructed with at least a second slot into which wire of said rotor winding is emplaced, the two slots being separated from each other by a wall, said wall being provided with a passageway for the transitioning of rotor winding wire between the two slots.

3. A transformer according to claim 2 characterized in that the rotor winding wire after several turns in said first slot is transferred via said passageway to said second slot adjacent thereof.

4. A transformer according to claim 1 wherein the width of said first slot is dimensioned in such a way that the rotor winding wire is tightly fitted therein.

5. A transformer according to claim 1 wherein said rotor winding is formed of several wire layers inside said first slot, one layer above another.

6. A transformer according to claim 1 wherein said coil carrier ring is equipped with a slit to form a snap ring for use in conjunction with insertion of said carrier into the recess of said second core.

* * * * *